US007424798B2

(12) United States Patent
Sytema

(10) Patent No.: US 7,424,798 B2
(45) Date of Patent: Sep. 16, 2008

(54) INSERTER FOR INSERTING POSTAL ITEMS INTO ENVELOPES

(75) Inventor: Herman Sytema, Terhorne (NL)

(73) Assignee: NEOPOST Technologies, Bagneux (FR)

( * ) Notice: Subject to any disclaimer, the term of this patent is extended or adjusted under 35 U.S.C. 154(b) by 0 days.

(21) Appl. No.: 11/561,180

(22) Filed: Nov. 17, 2006

(65) Prior Publication Data

US 2007/0125045 A1 Jun. 7, 2007

(30) Foreign Application Priority Data

Nov. 18, 2005 (EP) ................................ 05077 638

(51) Int. Cl.
*B65B 43/26* (2006.01)
*B65G 59/06* (2006.01)

(52) U.S. Cl. ............................ 53/564; 53/469; 53/568; 53/284.3; 53/381.5; 414/797.4; 414/797.7; 414/797.8; 271/2; 271/3.05

(58) Field of Classification Search .................. 53/469, 53/564, 569, 284.3, 381.5, 381.7, 460; 271/2, 271/3.05; 414/797.4, 797.6, 797.7, 797.8
See application file for complete search history.

(56) References Cited

U.S. PATENT DOCUMENTS

| | | | | |
|---|---|---|---|---|
| 1,050,476 | A | 1/1913 | Liljeros | |
| 2,727,178 | A | 12/1955 | Kern | |
| 3,253,384 | A | 5/1966 | Huck et al. | |
| 4,079,576 | A * | 3/1978 | Morrison et al. | 53/284.3 |
| 4,649,691 | A * | 3/1987 | Buckholz | 53/53 |
| 4,884,793 | A | 12/1989 | Hurst | |
| 5,251,425 | A | 10/1993 | Kern | |
| 5,618,375 | A * | 4/1997 | Suzuki et al. | 156/442.3 |
| 5,950,399 | A * | 9/1999 | Viens et al. | 53/381.6 |
| 5,975,514 | A * | 11/1999 | Emigh et al. | 270/58.06 |
| 6,698,748 | B1 * | 3/2004 | Crowley | 271/98 |
| 6,865,866 | B2 * | 3/2005 | Hsieh | 53/569 |

FOREIGN PATENT DOCUMENTS

| | | |
|---|---|---|
| CH | 453 950 | 3/1968 |
| DE | 1 461 690 | 8/1963 |
| EP | 0 490 686 B1 | 4/1996 |
| GB | 1084262 | 9/1967 |

* cited by examiner

*Primary Examiner*—Hemant M Desai
(74) *Attorney, Agent, or Firm*—Sughrue Mion, PLLC

(57) ABSTRACT

Inserter for inserting postal items into envelopes, wherein an envelope catcher separates the envelopes and transports the envelopes away from the stack of empty envelopes and the envelopes are subsequently transported further with the initially leading flap end trailing. The envelope catcher is suspended for movement and drivable along a catcher path, of which at least a section extends closely along the envelope to be separated. When the envelope is transported away from the envelope catcher with its flap end trailing the flap is folded open.

10 Claims, 9 Drawing Sheets

INSERTER FOR INSERTING POSTAL ITEMS INTO ENVELOPES

CROSS-REFERENCE TO RELATED APPLICATIONS

This application claims priority from Dutch Patent Application No. 05077638.4 filed Nov. 18, 2005.

TECHNICAL FIELD AND BACKGROUND ART

The claimed invention relates to an inserter and a method for inserting postal items into envelopes.

Inserters generally perform several functions such as separating and transporting of individual envelopes and documents, opening envelope flaps and inserting documents into the envelopes. Such machines are relatively complicated and accordingly costly and occupy a large amount of space.

In U.S. Pat. No. 1,050,476, an inserter for inserting postal items into envelopes having an envelope body and a flap linked to the envelope body via a fold is disclosed. This inserter includes a hopper for holding a stack of envelopes with an outer envelope in a separating position oriented in a separating plane, with the flap, folded against or oriented at an acute angle to the envelope body on the outside of the stack of envelopes. An envelope catcher is suspended for movement and drivable along a catcher path, of which a section extends closely along the separating plane, with a free edge leading for engaging an envelope in the separating position at the inside of the fold linking the flap to the envelope body and entraining the caught envelope, with the envelope body trailing the fold, along a trajectory away from the envelope hopper towards an inserting position. To bring the envelope body in the inserting position, so that documents can be inserted therein from a postal item transport path leading to the inserting position, the envelope body is pivoted over 270°. After the envelope has been filled, the envelope is pivoted back over 270° and subsequently pushed off the envelope catcher and transported further with the fold between the envelope body and the flap leading. A disadvantage of such an inserter is its limited capacity in terms of numbers of envelopes that can be processed per unit of time and the complex structure that is required to swing the envelopes out of the transport path and back, both over 270°.

SUMMARY

It would be advantageous to provide a simple solution that allows envelopes separated from a stack by a catcher engaging in a fold between the flap and the envelope body to be transported to a hopper at a higher rate.

According to the disclosed embodiments, an inserter is provided for inserting postal items into envelopes including an envelope body and a flap linked to the envelope body via a fold, the inserter including:

- a hopper for holding a stack of envelopes with an outer envelope in a separating position oriented in a separating plane, with the flap, folded against or oriented at an acute angle to the envelope body on the outside of the stack of envelopes;
- an envelope catcher suspended for movement and drivable along a catcher path, of which at least a section extends closely along the separating plane, with a free edge leading for engaging an envelope in the separating position at the inside of the fold linking the flap to the envelope body and entraining the caught envelope, with the envelope body trailing the fold, along a trajectory from the separating position to an end position for holding an envelope in a position for receiving postal items therein;
- a transport path from the end position to the inserting post for transporting the envelope with the fold between the flap and the envelope body trailing the envelope body; and
- a postal item transport path leading to an inserting post for transporting postal items to be inserted into the envelope at the inserting post.

Also according to the disclosed embodiment, a method is disclosed for inserting postal items into envelopes, the envelopes each including an envelope body and a flap linked to the envelope body via a fold, including:

- holding a stack of envelopes with an outer envelope in a separating position oriented in a separating plane, with the flap folded against or oriented at an acute angle to the envelope body, on the outside of the stack of envelopes;
- moving an envelope catcher along the separating plane with a free leading edge leading, the envelope catcher engaging each of the envelopes in the separating position at the inside of the fold linking the envelope's flap to the envelope's body;
- the catcher entraining caught envelopes, with the envelope body trailing the fold, from the separating position to an end position;
- transporting envelopes from the end position to an inserting position with the fold between the flap and the envelope body trailing the envelope body;
- folding open the envelope flap during transport from the end position to the inserting position;
- holding envelopes in a position for receiving postal items therein; and
- transporting postal items to be inserted into the envelope held in the inserting position.

By providing a transport path from the end position to the inserting post for transporting the envelope with said fold between the flap and the envelope body trailing the envelope body, the envelopes are disengaged from the catcher in a simple manner, the end position is catcher does not need to lead the envelope all the way the inserting position and does not need to stay there during insertion of documents, so that the catcher becomes available for separating a next envelope at a relatively early stage.

Particular embodiments of the invention are set forth in the dependent claims.

Further aspects, effects and details of the invention are set forth in the detailed description with reference to examples of which some are shown in the schematic drawings.

DETAILED DESCRIPTION

Figure 1:
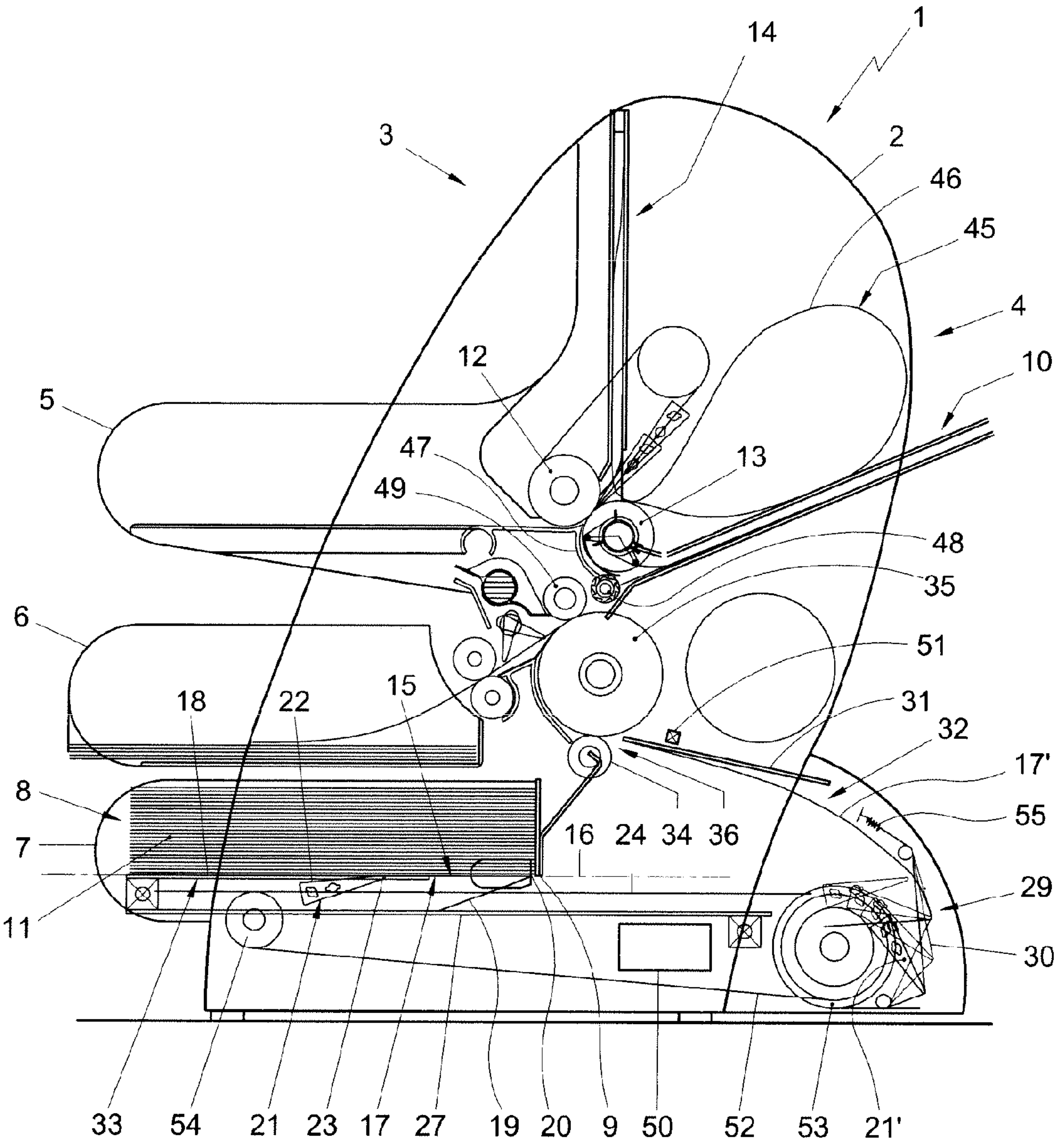
FIG. 1 is a schematic cut-away side view of a first example of an inserter according to an aspect of the invention.

A housing 2 of the inserter 1 shown in FIGS. 1-4 has a front side 3 and a backside 4. At the front side 3, a document tray 5, a mail piece tray 6 and a hopper tray 7 are situated. The document tray is for holding documents to be inserted, the mail piece tray 6 under the document tray 5 is for receiving mail pieces (filled envelopes) 6, and the hopper tray 7 under the mail piece tray 6 includes a hopper 8 for holding a stack of envelopes 11.

Within the housing 2 and projecting therefrom at the backside 4 of the housing 2, an inserting post 10 is situated for holding an envelope in a position for receiving postal items therein.

A postal item transport path for transporting documents to an inserting post 10 extends from the document tray 5 to the inserting post 10 and comprises a branch formed between the folding rollers 12, 13 ending in a buckle chute 14. A free space next to the buckle chute 14 allows the formation of a loop 46 in a document 45 to be folded when the document abuts a stop in the chute and is transported further by the rollers 12, 13. After folding, the folding rollers 12,13, a guide 47 and insert rollers 48 deliver the folded document 45 or documents to the inserting post 10, already holding an envelope with its flap open and held between central roller 35 and transport roller 49. After the document or documents have been inserted into the envelope, the envelope is transported from the inserting post 10 to the mail piece tray 6. During transport the envelope is closed. Structures for the insertion of documents as well as for the closing of envelopes are disclosed in more detail in applicant's Dutch patent applications 1027933, 1027937 and 1027940.

The hopper 8 is arranged for holding a stack 11 of envelopes, with one outer envelope 17 in a separating position 15. The envelopes are of the type with an envelope body 18 and a flap 19 connected via a fold 20 to the envelope body 18, as best seen in FIG. 2. The stack of envelopes 11 in the present example is situated in a vertical configuration with the outer envelope 17 being the lowermost envelope of the stack 11 in a separating position 15 at the bottom of the stack 11. The body 18 of the envelope 17 in the separating position 15 rests against an abutment 33 and the rest of the stack 11 on top of the lowermost envelope 17, is also, although indirectly, supported by the abutment 33. All the envelopes in the stack 11 are lying with their flap 19 towards the separating position 15, the flap 19 of the lowermost envelope 17 being located on the outside of the stack and hanging free since this part of the envelope 17 is not supported by the abutment 33.

The abutment 33 defines a separating plane 16 against which the body 18 of the envelope 17 in the separating position 15 lies.

Below the stack of envelopes 11, an envelope catcher 21 is situated. In the present embodiment, the envelope catcher 21 is wedge-shaped. If the envelope catcher 21 is in the starting position near the envelope body 18 as shown in FIG. 1, a free edge 23 of the envelope catcher 21 points towards the fold 20 linking the flap 19 to the body 18 of the envelope 17 in the separating position 15.

The envelope catcher 21 is mounted to a belt 52 tensioned over end pulleys 53, 54. If the pulleys are rotated, the catcher 21 is moved along a catcher path 24 of which a section extends closely along the separating plane 16, and closely along the envelope 17 in the separating position 15. In one direction of movement, the free edge 23 of the catcher 21 is leading for engaging the envelope 17 in the fold 20 linking the flap 19 and the envelope body 18 and entraining the caught envelope 17, with the envelope body 18 trailing the fold 20, along a trajectory from the separating position 15 to an end position 29 spaced from the envelope hopper 8. A first guide 27 extends closely below and along the envelope catcher path 24, for preventing the flap 19 of the envelope 17 from opening beyond an acute angle relative to the envelope body, so that the envelope catcher 21 reliably engages and entrains the envelope 17.

To counteract that the envelope catcher 21 entrains more than one envelope at a time, a threshold 9 below the separating plane 16 and accordingly below the stack 11 of envelopes 17 is provided closely at the side of the envelope hopper 8 and of the stack 11 of envelopes facing in the direction of transport from the separating position 15 to the end position 29. In this example, this threshold is formed by an edge 9 of the envelope hopper 8 protruding below the separating plane 16 and accordingly below the stack 11 of envelops.

Figure 2A:
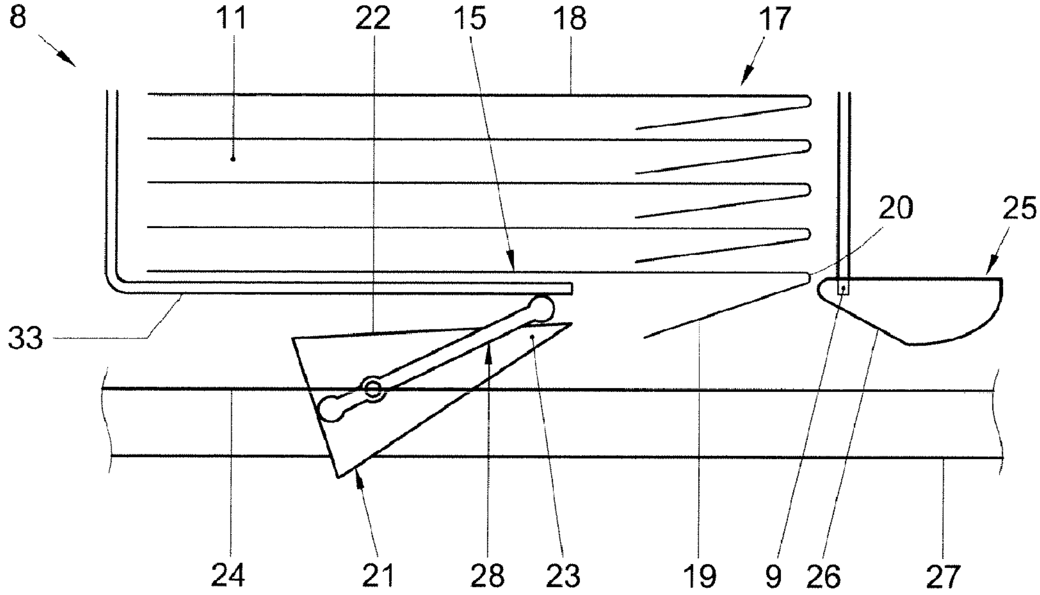
FIGS. 2A and 2 B are schematic side views of a portion including an envelope hopper of the inserter according to FIG. 1 in successive operating phases.
Figure 2B:
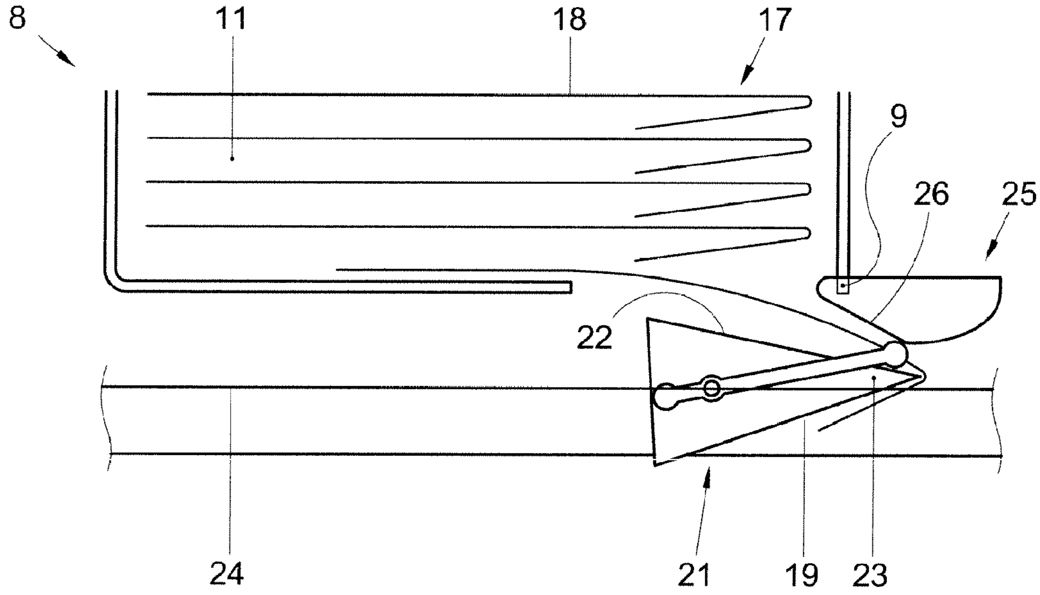

FIG. 2 A illustrates how, in operation, before engagement by the envelope catcher 21, an envelope 17 may be located in the separating position 15 and FIG. 2B illustrates how the envelope 17, after engagement by the envelope catcher 21, may be entrained past the threshold 9. The envelope catcher 21 is pivotably suspended, such that its free edge 23 can shift to and away from the separating plane 16. Cam 25 (see also FIG. 3) define cam tracks 26 extending along the catcher path 24 and a cam follower 28 (see FIG. 2A) fixed for pivotably entraining the catcher 21, cause the free edge 23 of the envelope catcher 21 to shift such that, after engaging the envelope 17, and before passing the threshold 9, the free edge 23 of the envelope catcher 21 shifts downward and pulls the portion of the envelope adjacent the fold between the envelope flap 19 and the envelope body downwards (i.e. in stacking direction away) from the stack of envelopes 11 while the envelope is also pulled along in the general direction of movement of the catcher 21 along the transport path 24. The free edge 23 of the envelope catcher 21 stays in the position shifted downward at least until it has passed the adjacent edge 9 of the hopper 8. Thus, the fold 20 of the envelope 17 is urged down beyond the threshold 9, thereby allowing the envelope body 18 to pass the threshold 9. A next envelope of the stack 11, of which the fold between the flap and the envelope body is not urged downward and is therefore reliably held back by the threshold 9.

The envelope catcher 21 has a support surface 22 that faces the separating plane 16 when the envelope catcher 21 is in a portion of the catcher path 24 that extends along the separating plane 16. In operation, the support surface 22 supports the envelope body 18 during transport by the envelope catcher 21.

Figure 3:
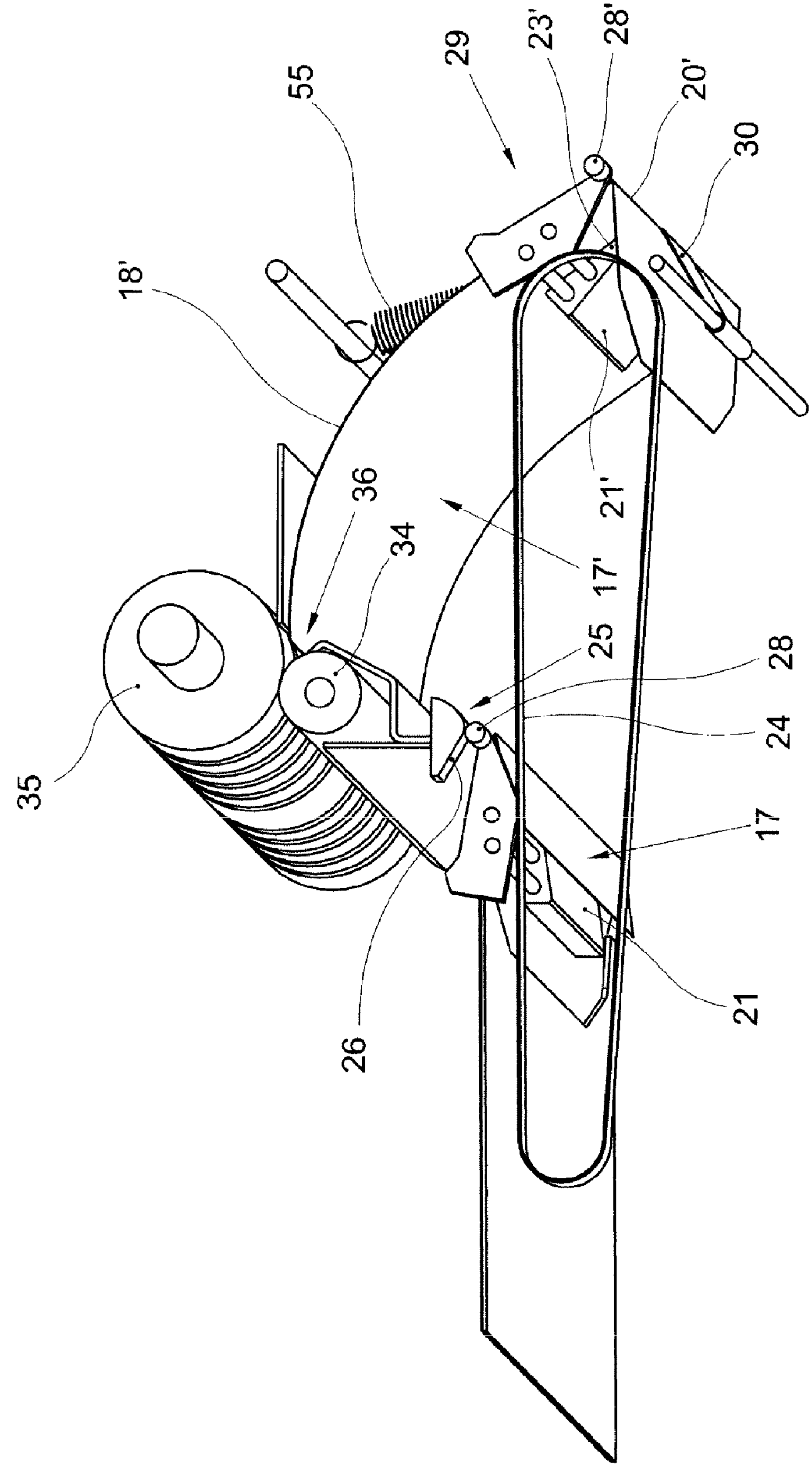
FIG. 3 is a schematic cut-away perspective view from below of a portion including a catcher drive, an end position and a nip of an envelope transport track of the inserter according to FIGS. 1 and 2.
Figure 4A:
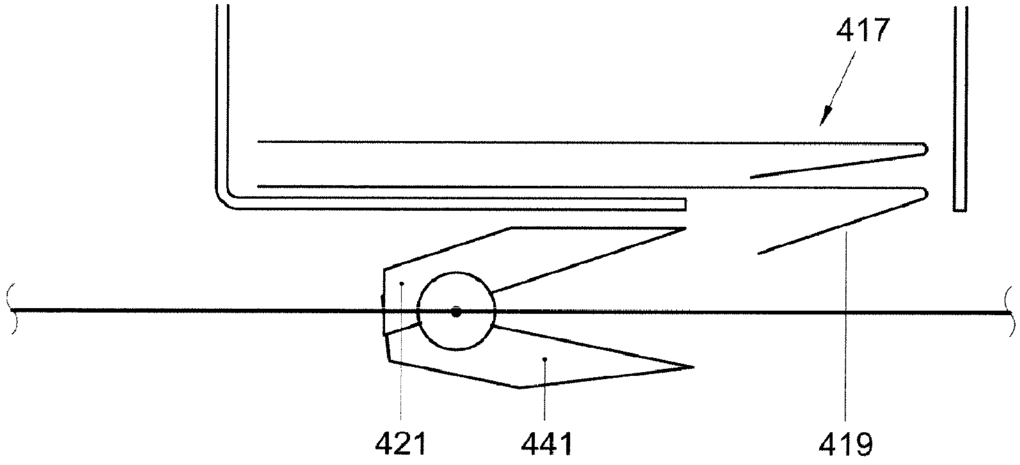
FIGS. 4A and 4B are schematic side views of a portion including an envelope catcher of a second example of an inserter according to an aspect of the invention in successive operating phases.
Figure 4B:
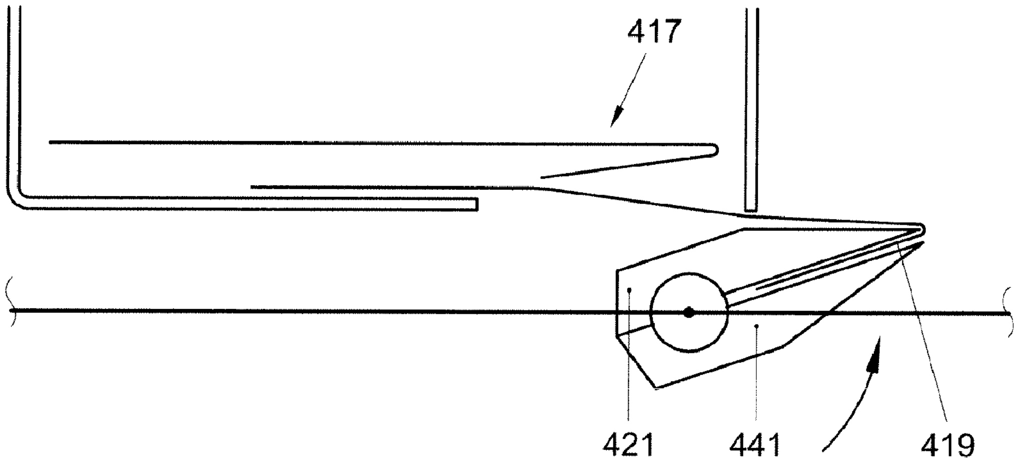

As is best seen in FIGS. 1 and 3, while reaching the end position 29, the catcher 21' turns into an orientation in which its support surface 22 is approximately in-line with the transport path 32. This causes the envelope body 18' to be pivoted into an orientation in the transport path 32. In FIG. 1, a succession of positions of the catcher 21 close the end position 21' is shown in dash and dot lines. When the envelope 17 is transported from the end position 29 to the inserting post 10 the envelope body 18 is leading the fold 20 and the flap 19.

Near the end position 29 the catcher path 24 is curved away from the separating plane 16. A resilient abutment 30 is located at the end of the catcher path 24 and near the end position 29. In operation, the catcher 21 presses the envelope 17 against the abutment, thereby causing the envelope 17 to be held between the abutment 30 and the free edge 23 of the envelope catcher 21 in the area of the fold 20 between the envelope flap 19 and the envelope body 18. This ensures that the tilting of the support surface 22 of the envelope catcher 21 reliably causes the envelope 17 to swing into the transport path 32 leading to the inserting post 10. An upper guide 31 along the transport path 32 is provided for guiding the envelope body 18 in the correct direction to a nip between the rollers 34, 35 (FIGS. 1 and 3).

In this example, the resilient abutment 30 is formed by a band 30. When the catcher is in the end position 29, the abutment 30, is locally displaced by the fold 20 of the envelope 17, which in turn was pressed against the abutment 30 by the free edge 23 of the catcher 21', against the action of a spring 55. After the envelope 17' has changed orientation and is positioned in the transport path 32, the envelope catcher 21' returns along the path 24 to its starting position. This causes the tensioned abutment 30 to spring back, thereby pushing against the fold 20 of the envelope 17' and causing the envelope 17' to be pushed into the transport track 32 with the envelope body 18 leading the fold 20, until the envelope body 18 is urged into a nip 36 between transport rollers 34, 35 that then take over the further transport of the envelope 17' towards the inserting post 10.

When the transport rollers 34, 35 take over the transport of the envelope 17' and the fold 20 is free from the abutment 30, band 30,the flap 19 is pulled around the envelope catcher 21 so that it is opened to an extent that is sufficient to ensure that, when passing the transport rollers 34, 35 towards the inserting post 10, the flap 19 is trailing the body 18 of the envelope 17. The envelope 17 arrives in the inserting post with the flap 19 fully trailing the envelope body.

A control unit 50 is connected to the drive structure for controlling the driving of the transport rollers 34, 35 and the rollers 53, 54. A sensor 51 is arranged along the transport path 32 for registering that the envelope body 18 at the end of the catcher path 24 has been turned to a position in the transport path 32. The control unit 50 is arranged for changing the sense of rotation of the pulleys 53, 54 in response to an envelope being detected by the sensor 51, thereby causing the envelope catcher 21 to return from its end position 29 to a starting position upstream adjacent the holder 8.

Since the envelope catcher 21 engages the envelope in the fold between the envelope flap 19 and the envelope body 18, it is not necessary to grip the envelope flap and a propensity of gripping surfaces to cause stains when gripping a stationary envelope during movement is avoided. Also, the envelope is engaged on a surface that is on its inside after closing, so that the engagement cannot cause staining on the outside at all.

It will be clear to the skilled person, that within the framework of invention as set forth in the claims also many variations other than the examples described above are conceivable.

For instance, as shown in FIGS., 4A and 4B, instead of a separate, stationary guide 27 for limiting opening the flap 19 of the envelope 17, a two-part envelope catcher 421 may be provided, which closes when engaging the envelope 417. The catcher 421 has a clamping part 441. This clamping part 441 can be guided by for example a cam track (not shown) from a position further away, to a position along the envelope catcher 421 when engaging the envelope flap 419. Thus, a movable guide limits the opening of the envelope flap. Since the envelope flap need not be clamped between the two parts of the catcher 421 to entrain the envelope, it is reliably ensuring that the flap 419 will not slip during transport and staining caused by such slipping of a clamped envelope is avoided.

Figure 5A:
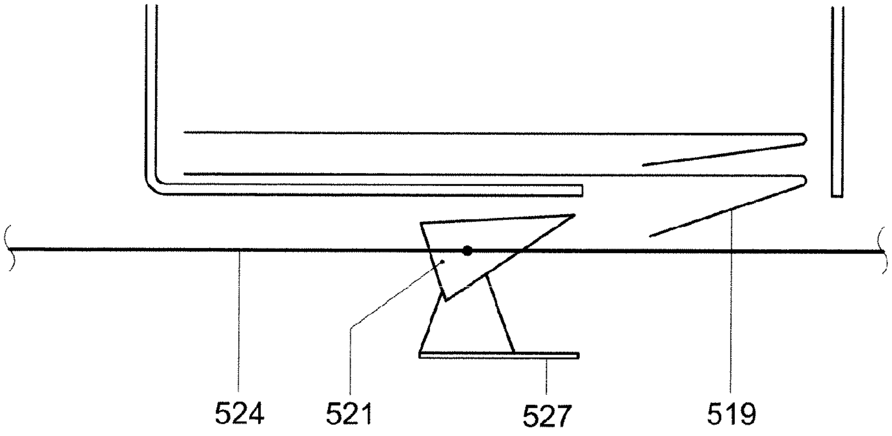
FIGS. 5A and 5B are schematic side views of a portion including an envelope catcher of a third example of an inserter according to an aspect of the invention in successive operating phases.
Figure 5B:
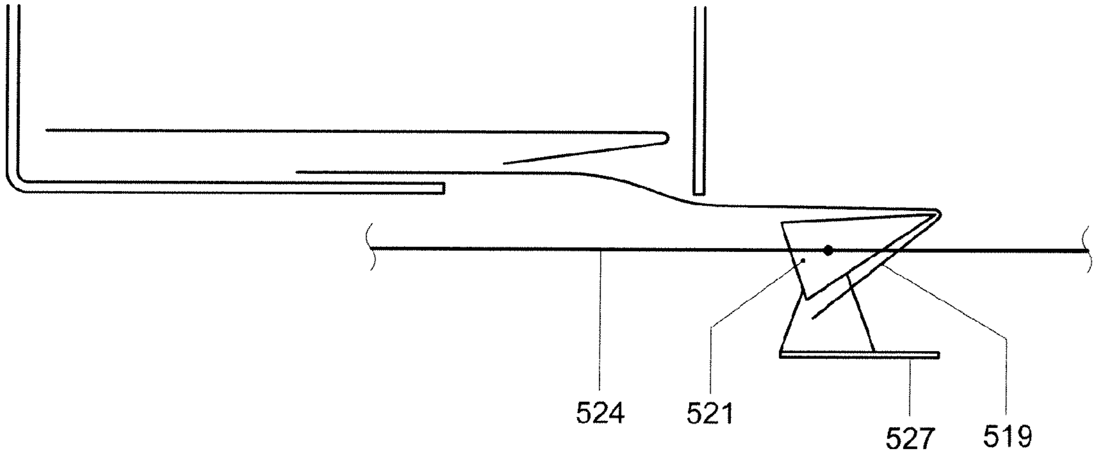
Figure 6C:
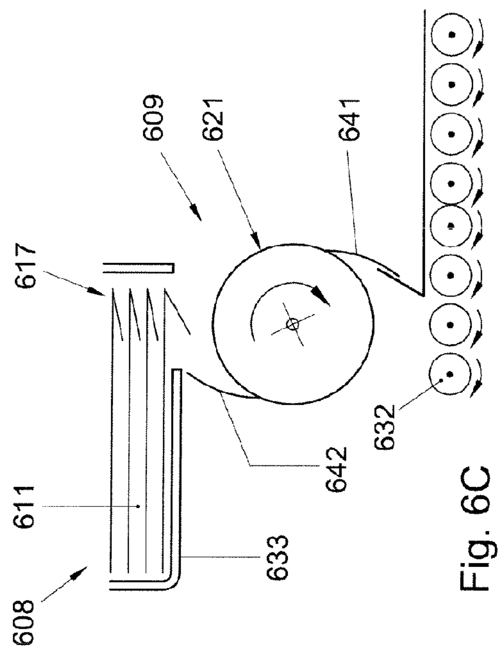
FIGS. 6A to 6D are schematic side views of a portion including an envelope hopper, an envelope catcher and a transport track of a fourth example of an inserter according to an aspect of the invention in successive operating phases.
Figure 6D:
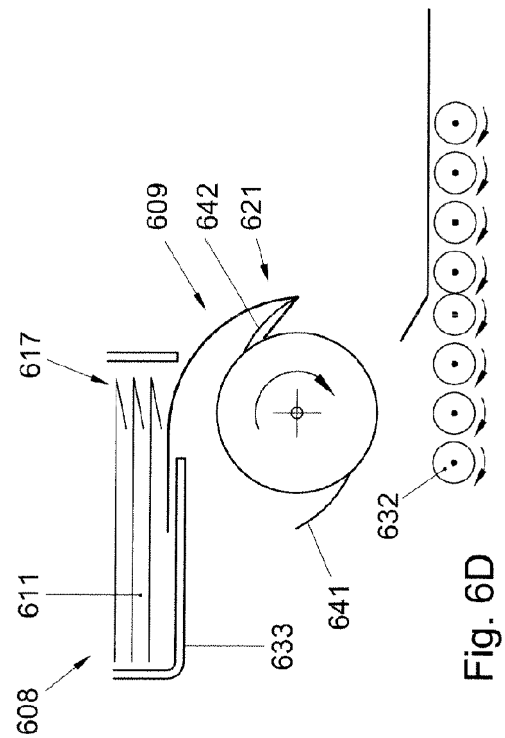
Figure 6A:
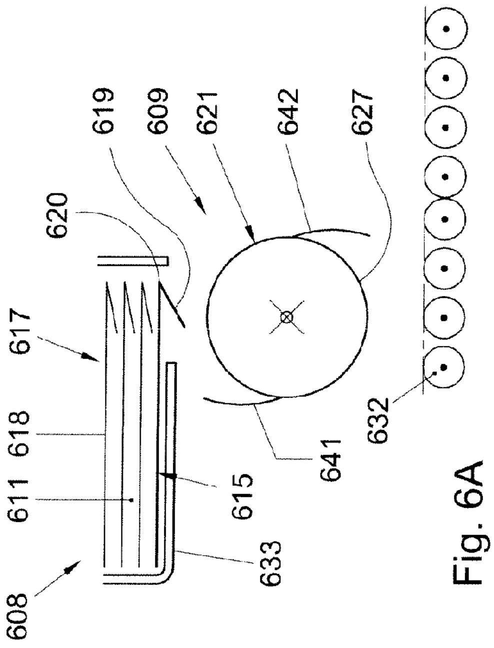
Figure 6B:
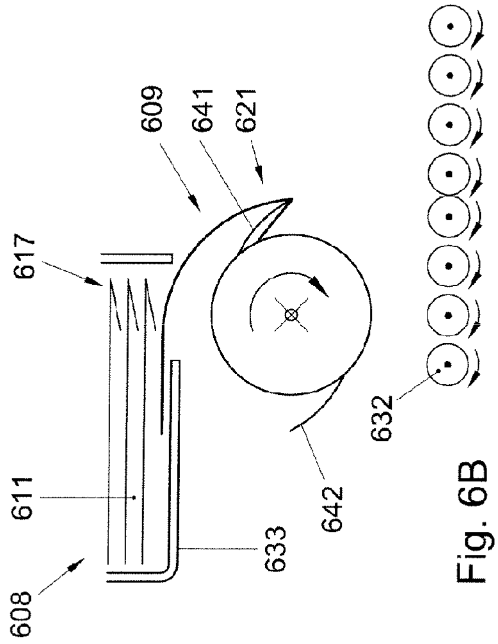

Another example of a movable envelope flap guide is shown in FIGS. 5A and 5B. In this embodiment, the envelope catcher 521 is provided with a guide 527 that is connected to the catcher 521, such that moves along with the catcher 521. Therefore, there is no need for a guide extending along the catcher path 524. Since the guide 527 is spaced from the envelope catcher 521, an envelope flap can enter between the catcher 521 and the guide 527 and be pulled out from between the catcher 521 and the guide 527 after it has reached the end position without having to move the guide 527 relative to the catcher 521.

In yet another embodiment shown in FIGS. 6A to 6D, instead of an envelope catcher 21 mounted to a belt and movable along a path which is essentially straight in the vicinity of the hopper 8 and the stack 11, a catcher wheel 621 is provided which is equipped with catchers 641, 642 mounted to its circumference for movement along a circular path. The catcher wheel 621 is positioned between the hopper 608 containing the stack of envelopes 611 with the envelope 617 in the separating position 615 and a transport path 632.

When the catcher wheel 621 rotates in a clockwise sense, the catcher 641 engages an envelope 617 positioned in the separating position 615 at the inside of the fold 620 connecting the flap 619 to the envelope body 618. The envelope 617 is then pulled away from between the rest of the stack of envelopes 611 and the abutment 633. The envelope 617 partially bends around the catcher wheel 621 until the trailing edge of the envelope 617 has passed the threshold edge 609 of the hopper 608. The envelope 617 then falls onto the transport path 632. The distance between the catcher wheel 621 and the transport path 632 is larger than the distance between the catcher wheel 621 and the separating position 615. Therefore, once the envelope 617 has dropped onto the transport track 632, the free edge of catcher 642 is no longer engaging the envelope 617 in the fold 620 but further away from the envelope body. The catcher 642, still engaging a part of the flap, is still moving in the clockwise direction while the transport path 632 moves the envelope 617 in the opposite direction. This causes the envelope flap to fold open. To ensure transport of the envelope along the transport track 632, one or more clamping rollers or belts may press the envelope 617 against the rollers forming the underside of the transport track 632.

Figure 7A:
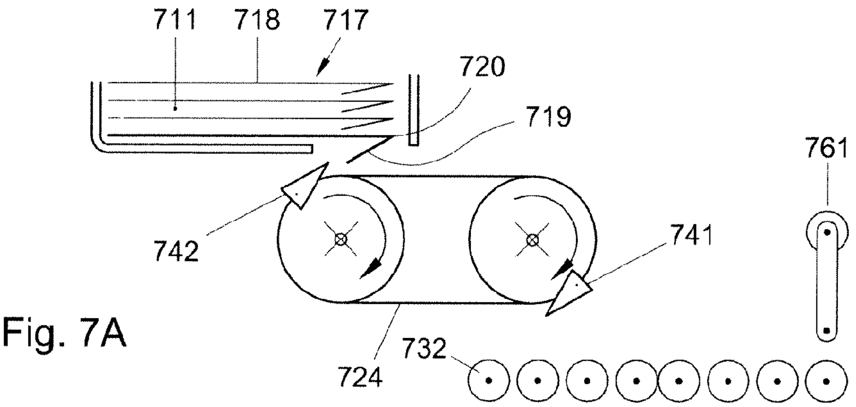
FIGS. 7A to 7D are schematic side views of a portion including an envelope hopper and an envelope catcher of a fifth example of an inserter according to an aspect of the invention in successive operating phases.
Figure 7B:
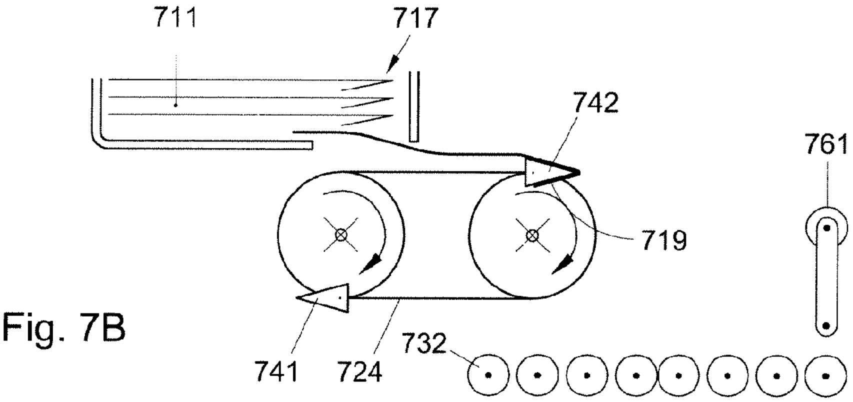
Figure 7C:
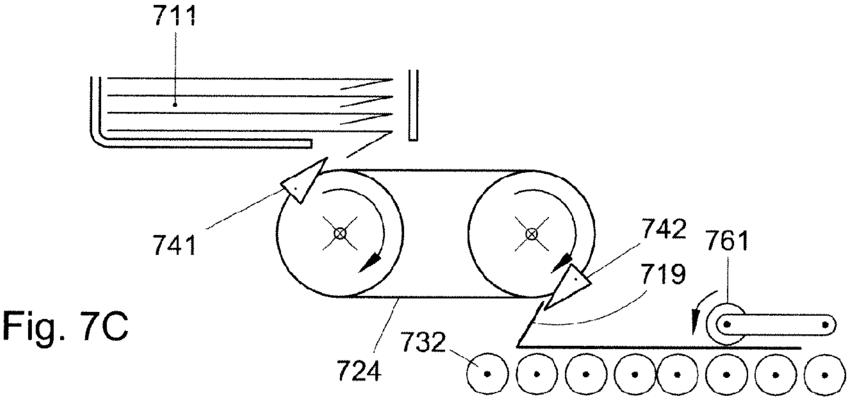
Figure 7D:
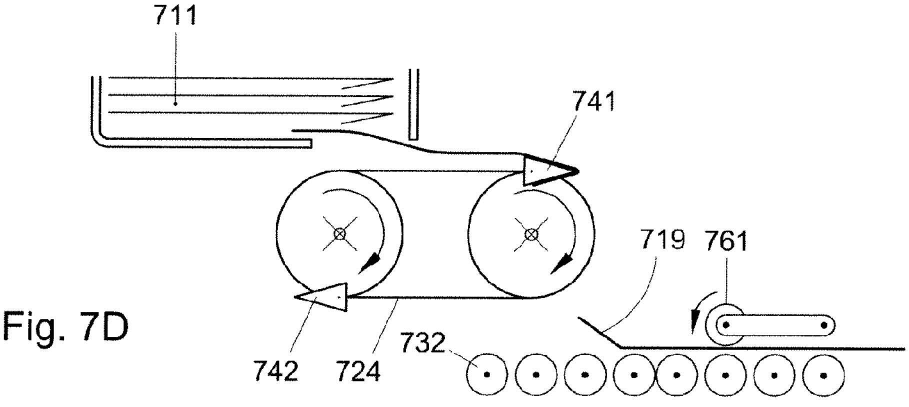

Yet another example of an inserter according to the invention is shown in successive stages of operation in FIGS. 7A-7D. Two envelope catchers 741, 742 are attached to a belt or chain that is tensioned over end pulleys as shown in FIGS. 1 and 3. The envelope catchers 741, 742 are movable along a circulating catcher path 724. When the catchers 741, 742 circulate in a clockwise sense, each time the catchers 741, 742 pass an envelope in the separating position 717, the respective one of the catchers 741, 742 engages a next one of the envelopes 717 in the separating position at the inside of the fold connecting the flap to the envelope body. The envelope 717 is then pulled away from between the rest of the stack of envelopes 711 and the support on which the stack rests. The envelope 717 swings around the turning point of the catcher path 724 (FIG. 7B) and then falls onto the transport path 732. The distance between the catcher path 724 and the transport path 732 is larger than the distance between the catcher path 724 and the separating position. Therefore, once the envelope 717 has reached a position in the transport track 732, the free edge of catcher 741 or 742 is no longer engaging the envelope 717 in the fold but further away from the envelope body (see FIG. 7C). The catcher 741 or 742, still engaging a part of the flap, is still moving in the clockwise direction while the transport path 732 moves the envelope 717 in the opposite direction. This causes the envelope flap to fold open (FIG. 7C). To ensure transport of the envelope along the transport track 732, clamping rollers 761 are provided for pressing the envelope 717 against the rollers forming the underside of the transport track 732.

An extra advantage of the embodiments shown in the FIGS. 6 A-D and 7 A-D in which at least two catchers circulate along the separating position, is that while a first envelope catcher is still engaged in an envelope positioned in for example the transport path, a second envelope catcher can already engage the next envelope in the separating position.

Figure 8A:
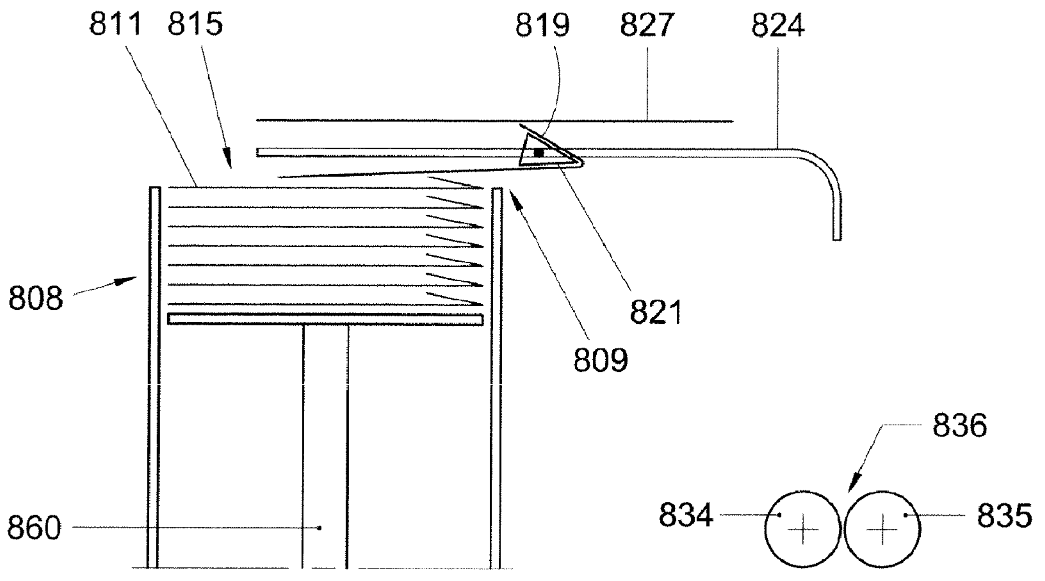
FIGS. 8A and 8B are schematic side views of a portion including an envelope hopper, an envelope catcher and a transport track of a sixth example of an inserter according to an aspect of the invention in successive operating phases.
Figure 8B:
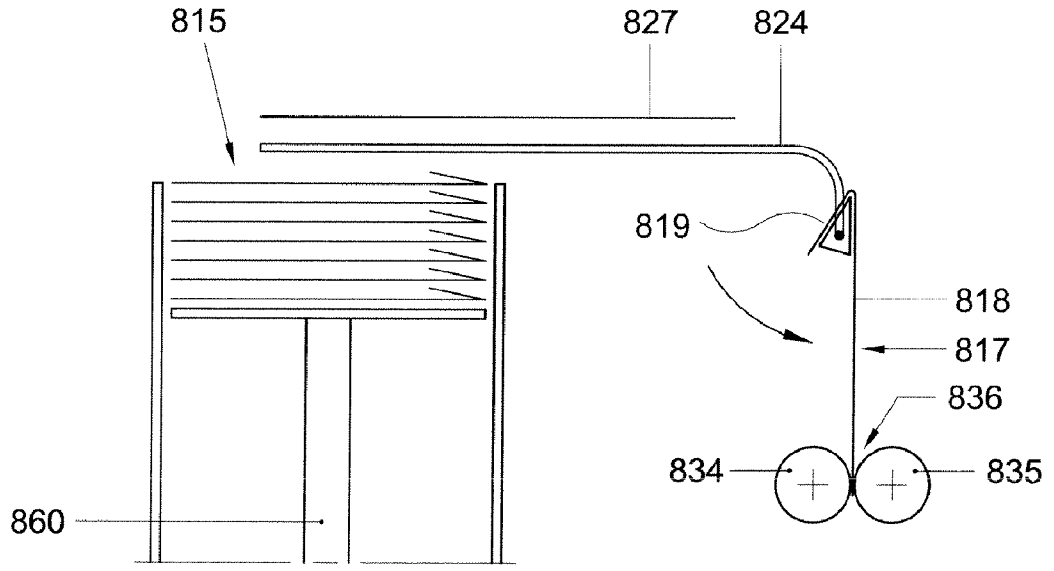

In FIGS. 8A and 8B, yet another variant for the envelope supply is shown. In this example, the separating position 815 is at the top of the stack of envelopes 811. A lift 860 is provided for keeping the topmost envelope of the stack 811 in the separating position 815 closely to the catcher path 824 as the height of the stack 811 decreases during feeding of envelopes from the stack 811. Along the catcher path 824, a guide 827 for limiting opening of the flap 819 of the envelope 817 extends. When the envelope catcher 821 has entrained the envelope 817 over such a distance that the trailing edge of the envelope body 818 has become free from the edge 809 of the hopper 808, gravity causes the envelope body 818 to swing down to a vertical position oriented towards a nip between a pair of transport rollers 834, 835. As the catcher 821 moves along a downwardly oriented last section of the catcher path 824, the former trailing edge of the envelope 817 now forms a lowermost, leading edge, and the envelope 817 is lowered into the nip 836 between the transport rollers 834, 835. When the transport rollers 834, 835 engage the envelope 817, the envelope 817 is pulled down causing the envelope flap 819 to be folded open about the envelope catcher 821.

Figure 9A:
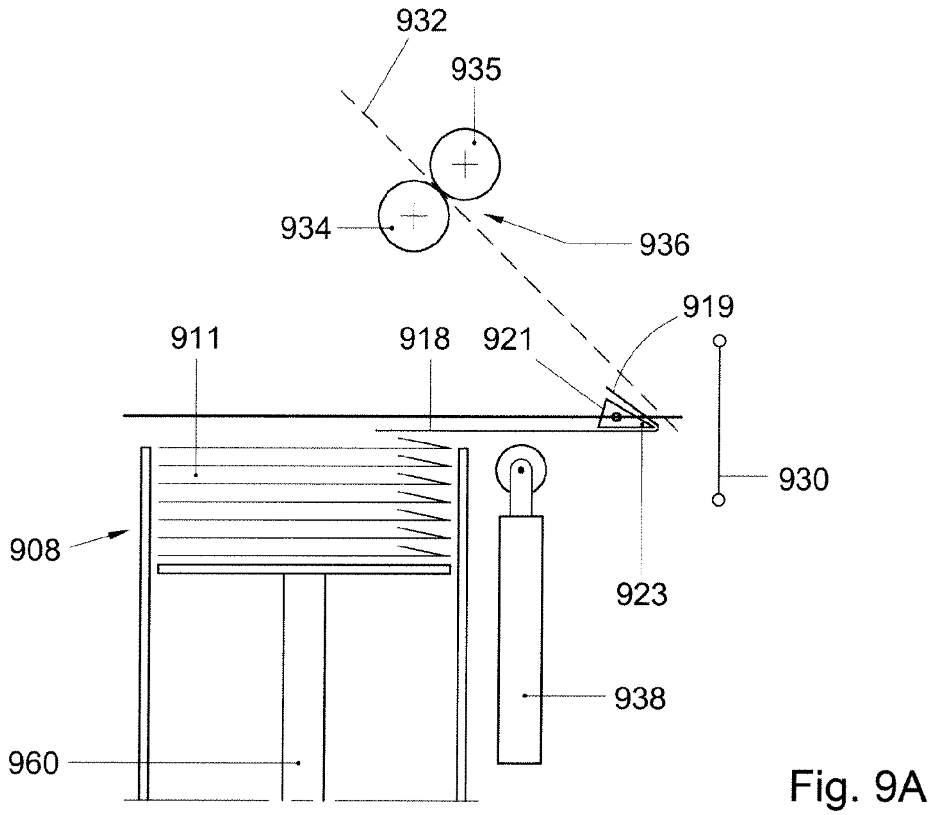
FIGS. 9A and 9B are schematic side views of a portion including an envelope hopper, an envelope catcher and a transport track of a sixth example of an inserter according to an aspect of the invention in successive operating phases.
Figure 9B:
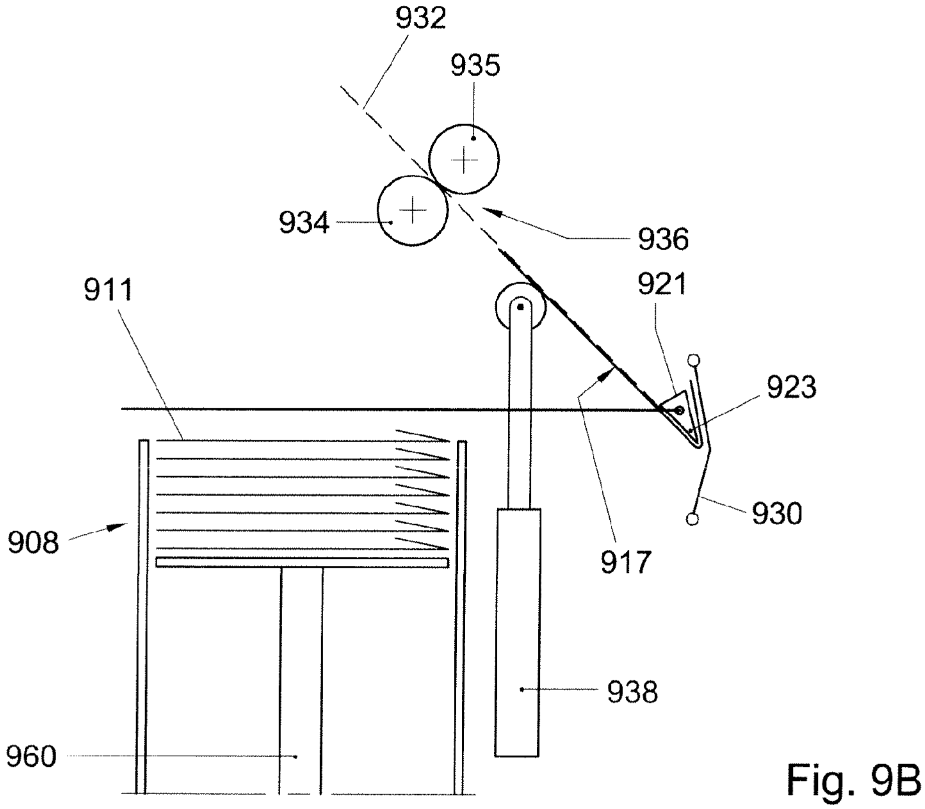

In the embodiment shown in FIGS. 9A and 9B, the hopper 908 and the stack 911 of envelopes has in principle the same configuration as in the embodiment shown in FIGS. 8 A and B, the separating position 915 being at the top of the stack in an approximately constant position, the stack 911 being lifted by a lift 960 as the height of the stack 911 decreases. However, in this example, the transport path 932 is oriented at an angle upward from the path along which the catcher 921 is movable. Accordingly the nip between rollers 934, 935 of the transport path 932 is located higher than the path along which the catcher 921 is movable. Under the path along which the catcher 921 is movable, a lifter 938 is located for lifting an envelope 917 that has been entrained by the catcher 921 upward to an orientation directed towards the nip between rollers 934, 935.

In operation, after separation from the stack 911, the envelope body 918 is urged by a plunger 938 into the transport path 932, the envelope 917 pivoting about the envelope catcher 921. As in the embodiment shown in FIGS. 1-4, the envelope is held pressed against the envelope catcher 921 by a resilient abutment 930. When the envelope catcher 921 moves back from its end position, the abutment 930 pushes envelope 917 with its body 918 leading into the nip 936. The transport rollers 934, 935 then transport the envelope 917 towards an end position, whereby the flap 919 of the envelope 917 is folded open about the free edge 923 of the envelope catcher 921.

Many other examples are possible within the framework of the invention as set forth in the claims, for instance an embodiment with the stack of envelopes in a horizontal configuration, the provision of a slit instead of a threshold for preventing more than one envelope passing through at a time, or fingers or grippers for a mechanical or pneumatic retaining of the stacked envelopes not yet to be transported.

The invention claimed is:

1. An inserter for inserting postal items into envelopes comprising an envelope body and a flap linked to said envelope body via a fold, said inserter comprising:

a hopper for holding a stack of envelopes with an outer envelope in a separating position oriented in a separating plane, with the flap, folded against or oriented at an acute angle to the envelope body on the outside of the stack of envelopes;

an envelope catcher suspended for movement and drivable along a catcher path, of which at least a section extends closely along said separating plane, with a free edge leading for engaging an envelope in said separating position at the inside of the fold linking the flap to the envelope body and entraining the caught envelope, with the envelope body trailing the fold, along a trajectory from said separating position to an end position while the free edge of the catcher engages the envelope at the inside of the fold linking the flap to the envelope body;

a transport path extending from said end position to an inserting post for holding the envelope in a position for receiving postal items therein, the transport path being arranged for transporting the envelope with said fold between the flap and the envelope body trailing the envelope body; and a postal item transport path leading to the inserting post for transporting postal items to be inserted into the envelope at the inserting post.

2. An inserter according to claim 1, further comprising an abutment positioned for at least partially retaining an outer envelope of the stack of envelopes in the separating position.

3. An inserter according to claim 1, further comprising a guide for limiting opening of the flap of the envelope.

4. An inserter according to claim 3, wherein the guide extends closely along at least a portion of the catcher path.

5. An inserter according to claim 3, wherein the guide is movable for moving along with the catcher along at least a portion of the catcher path.

6. An inserter according to claim 1, wherein the envelope catcher comprises a flap retainer for limiting opening of the flap of the envelope during at least a portion of the transport along the trajectory.

7. An inserter according to claim 1, further comprising a guide for causing the free edge of the envelope catcher to shift away from the separating plane closely upstream of an adjacent edge of the hopper for bounding a side of the stack of envelopes facing in the direction of transport, and for causing the free edge of the envelope catcher to remain shifted away from the separating plane at least until a position downstream of said adjacent edge.

8. An inserter according to claim 1, wherein the envelope catcher comprises a support surface facing the separating plane when the envelope catcher is in a portion of the catcher path extending along the separating plane, for at least partially supporting the envelope body during transport by the envelope catcher.

9. An inserter according to claim 8, wherein the envelope catcher is tiltable, about an axis parallel to the separating plane and transverse to the catcher path, for changing the orientation of the envelope body from a position parallel to the separating plane to a position in the transport path.

10. An inserter according to claim 1, further comprising a resilient abutment situated near the end position for clamping the fold, linking the flap with the envelope body, between the free edge of the envelope catcher and the resilient abutment, at least from arrival of the envelope in the end position, for urging the envelope into a nip that is part of the transport path.

* * * * *